United States Patent
Walker (10) Patent No.: US 6,557,903 B2
(45) Date of Patent: May 6, 2003

(54) TWIST LOCK HIGH PRESSURE QUICK CONNECTOR

(75) Inventor: Daniel H. Walker, Sylvan Lake, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/748,892

(22) Filed: Dec. 27, 2000

(65) Prior Publication Data

US 2002/0079698 A1 Jun. 27, 2002

(51) Int. Cl.$^7$ ................................................ F16L 37/00
(52) U.S. Cl. ........................... 285/305; 285/308; 285/81
(58) Field of Search .......................... 285/81, 305, 308, 285/310, 313, 314, 334.5

(56) References Cited

U.S. PATENT DOCUMENTS

| | | | | |
|---|---|---|---|---|
| 571,216 | A | * 11/1896 | Crowson | 285/308 |
| 4,610,468 | A | * 9/1986 | Wood | 285/308 |
| 5,028,080 | A | * 7/1991 | Denanny, Jr. | 285/308 |
| 5,342,095 | A | 8/1994 | Klinger et al. | 285/18 |
| 5,374,089 | A | 12/1994 | Davie et al. | 285/317 |
| 5,425,558 | A | 6/1995 | Dennany, Jr. | |
| 5,533,761 | A | * 7/1996 | Ostrander et al. | 285/308 |
| 5,542,716 | A | 8/1996 | Szabo et al. | 285/305 |
| 5,551,732 | A | * 9/1996 | Bartholomew | 285/305 |
| 5,593,188 | A | * 1/1997 | McNaughton et al. | 285/305 |
| 5,711,549 | A | 1/1998 | Beans | 285/93 |
| 5,718,459 | A | 2/1998 | Davie et al. | 285/148.19 |
| 5,730,481 | A | 3/1998 | Szabo et al. | 285/305 |
| 5,782,502 | A | 7/1998 | Lewis | 285/87 |
| 5,794,984 | A | * 8/1998 | Bartholomew | 285/305 |
| 5,863,077 | A | 1/1999 | Szabo et al. | 285/3 |
| 5,882,049 | A | 3/1999 | Beans | 285/321 |
| 5,951,063 | A | 9/1999 | Szabo | 285/303 |
| 6,113,151 | A | * 9/2000 | Beans | 285/305 |
| 6,170,886 | B1 | * 1/2001 | Bartholomew | 285/305 |
| 6,293,596 | B1 | * 9/2001 | Kinder | 285/81 |

* cited by examiner

Primary Examiner—Lynne H. Browne
Assistant Examiner—James M. Hewitt
(74) Attorney, Agent, or Firm—Young & Basile, P.C.

(57) ABSTRACT

A quick connector includes a male component in the form of a spool fixedly mounted to a fluid conduit and a female component in the form of a housing having a bore open at one end for receiving the male component therein. A latch is rotatably mountable on the spool and is movable relative to a transverse channel in the female component between a first installed position with respect to the channel and a second latched position wherein the latch engages opposed notches in the channel to latch the spool in the housing. At least one latch clip is mountable on the latch and engageable with edges of the channel in the body to resist rotation of the latch from the latched position. An optional secondary latch clip is engageable with the latch clip, the latch and the opposed side edges of the channel to further resist rotation of the latch from the latched position.

9 Claims, 5 Drawing Sheets

TWIST LOCK HIGH PRESSURE QUICK CONNECTOR

BACKGROUND

The present invention relates to high pressure quick connectors employed in fluid conduit systems, such as vehicle brake lines.

Snap fit or quick connectors have been found to be useful in a wide range of applications. In particular, quick connectors are frequently employed for joining fluid carrying conduits in automotive and industrial applications. Such connectors have found general acceptance as they are typically capable of being closed in a single uni-axial movement which facilitates automated assembly, and entail simple designs which are relatively inexpensive to produce.

A further advantage of quick connectors is that they provide an effective seal for handling volatile or hazardous fluids, such as gasoline, while permitting ease of disassembly and reassembly during repair of a host system.

In applications where hazardous material is to flow through a connector, for example, in vehicle brake lines, prevention of inadvertent release of the quick connector is of primary concern. Accordingly, relatively high axial pull apart strength specifications are mandated. In addition, low insertion forces are required.

Currently, for many high pressure applications, such as with brake lines, threaded fittings are used as the connection means. If not aligned correctly, cross threaded may result. If excessive torque is applied, over threading may result.

As a result of cross-threading or overthreading, the threads are stripped and the connector must be scrapped and replaced.

In current anti-lock brake systems, the brake lines are connected to a brake manifold or junction during the assembly process of the vehicle. The threaded connections of the prior art are located close together which increases assembly time and labor as well as the potential for error.

Various attempts have been made to overcome the problems associated with quick connectors employing threaded connections for high pressure applications. Such connectors typically include a male fitting body which is connected on the end of an elongated tube or conduit. The male fitting body has an annular recess for receiving a retainer movable between a compressed position allowing longitudinal insertion of the male fitting body within a corresponding bore in a female component housing and a released position for retaining the male fitting body seated within the bore. A locking member maintains the retainer in the released position in response to seating of the male fitting body within the corresponding female component housing. A pop top releasably engages the male fitting body to hold the retainer in the compressed position until the male fitting body is seated within the bore in the female component housing.

It is desirable for the present invention to provide a quick connector for high pressure fluid applications, particularly for vehicle brake systems, which facilitates assembly and disassembly of the quick connector in a manner which does not require the use of tools. It would also be desirable to provide such a quick connector that provides high axial pull apart strength and low insertion forces. It would also be desirable to provide a quick connector which eliminates threaded connections to reduce scrap as a result of frequent cross-threading or over-threading. It would also be desirable to provide a high pressure quick connector which has a compact design so that multiple quick connectors can be easily installed in a single fluid manifold.

SUMMARY

The present invention is a quick connector advantageously suited for use in high pressure fluid applications. In one aspect, the quick connector includes: a male connector including a conduit having a first end and a spool or fitting fixedly connected to the first end of the conduit, a female connector or component including a body having a bore extending from a first end, a channel extending transversely to the through bore, opposed recesses formed on opposite sides of the channel, a latch having an aperture mountable over the conduit and peripheral edges of large and small dimensions allowing the latch to be inserted into the channel in a first dimensional orientation position and rotated to a second, dimensional orientation, latched position in which opposed side edges engage the recesses in the body, and a latch clip engageable with the latch to resist rotation of the latch from the second, latched position.

The latch preferably comprises at least one finger tab extending from the latch to facilitate rotation of the latch between the first and second positions. More preferably, two finger tabs extend from the latch to facilitate bi-directional rotation of the latch between the first and second positions.

The peripheral edges of the latch define a generally rectangular shape having opposed major length side edges and opposed minor length side edges.

The latch clip includes a body having a generally U-shaped outer ring, end posts upstanding from opposed ends of the outer ring, a pair of spaced arms carried interiorly on the ring and engageable with of the spool for rotatably mounting the latch clip to the spool side. The end posts on the outer ring are engageable with opposed edges of the channel in the body to resist rotation of the latch clip and the latch relative to the body.

The quick connector of the present invention optionally includes a secondary latch clip engageable with the latch clip and the latch to further resist rotation of the latch clip and the latch from the second latched position of the latch. The secondary latch clip preferably includes a body having a central opening adapted to surround the fluid conduit, and apertures formed in the body engageable with the finger tabs on the latch and the end posts on the latch clip. The body is non-rotatably seatable in the channel with the body and the apertures in the body cooperating with the finger tabs on the latch and the end posts on the latch clip to assist in resisting rotation of the latch from the second latched position.

The unique quick connector of the present invention is suitable for use in high pressure applications and utilizes a twist latching movement to secure the male component of the quick connector in the female component housing. The present quick connector has a small compact shape while still providing easy accessibility to the latch member for latching and unlatching rotation of the latch member. A latch clip is provided to prevent rotation of the latch member from the latched position which could lead to undesired separation of the male component from the female component. An optional secondary or redundant latch clip can also be provided to ensure secure latching of the male component in the female component of the quick connector.

BRIEF DESCRIPTION OF THE DRAWING

The various features, advantages and other uses of the present invention will become more apparent by referring to the following detailed description and drawing in which.

DETAILED DESCRIPTION

Referring now to FIGS. 1–7 of the drawing, a quick connector 10 according to the present invention is formed of a number of components, namely a female connector component including a housing 12, and seal elements in the form of an O-ring 14 and a top hat 16, a male connector component including a spool 18 carrying a fluid conduit or tube 20, as well as a latch 22, a latch clip 24 and an optional secondary or redundant latch 26.

The housing 12 may be in the form of a separate body attachable in fluid communication with another housing, valve body, actuator, manifold, etc., not shown or integrated into a manifold, valve body, actuator, etc. The important features of the housing 12 which are incorporated into a stand alone body or an integrated body are a through bore denoted generally by reference number 28 in FIG. 3 and a transversely extending channel 30 formed at one end of the housing 12 and having opposed notches or recesses.

Figure 3:
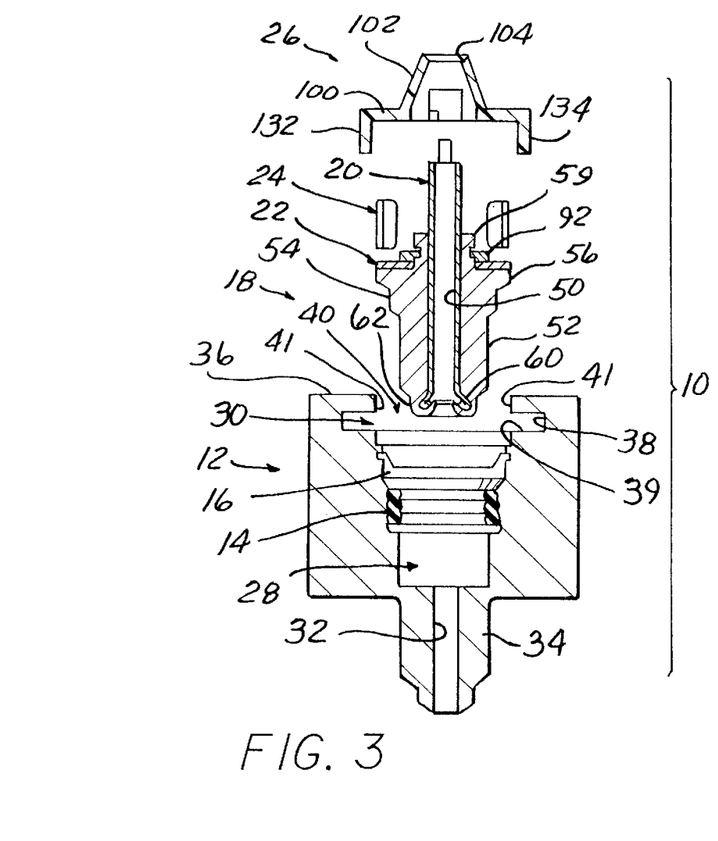
FIG. 3 is a partially exploded, longitudinal cross-sectional view of the quick connector of FIGS. 1 and 2 shown in a partially assembled state.

The bore 28 preferably has a stepped, multi-diameter cross sectional configuration for receiving and fixedly maintaining the top hat 16 and O-ring seal 14 in the desired position spaced from opposite ends of the bore 28 as shown in FIG. 3. The end portion or end bore portion 32 of the bore 28 is generally formed within an elongated stem 34 which is depicted merely by way of example only on the body of the housing 12. Formation of the bore 28 in an integral housing, valve body, actuator, manifold, etc., normally would not include the elongated stem 34.

The channel 30 is formed at a first end 36 of the body 12 transversely to the longitudinal axis of the bore 28. The channel 30 is formed with enlarged dimension, opposed notches 38 which are axially spaced inward from a smaller dimensional end slot formed in opposed side edges 41. The slot 40 opens through the first end 36 of the body 12. The notches 38 form an inner wall 39 at one end of the bore 28.

Figure 1:
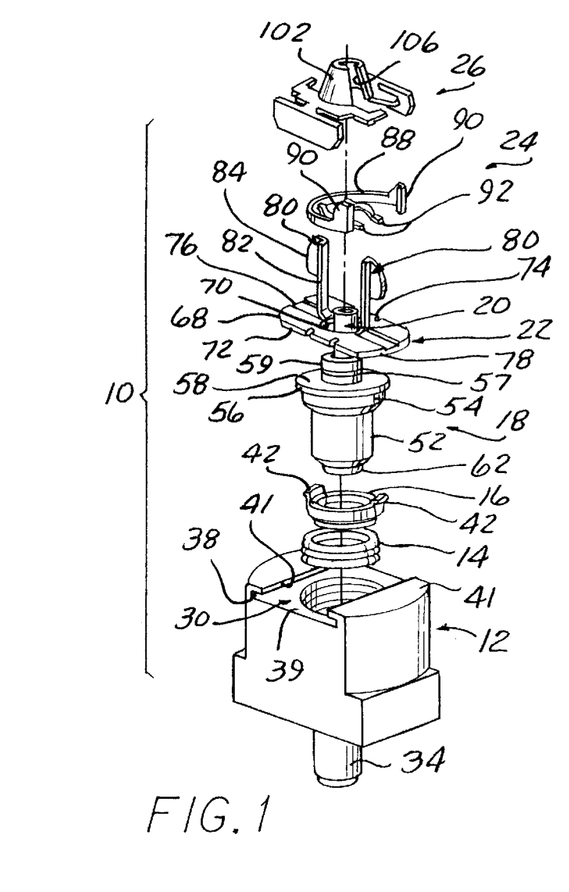
FIG. 1 is an exploded, perspective view of a high pressure quick connector according to the present invention.

As shown in FIG. 3, the seal elements are in the form of the O-ring 14 which may comprise a single or multiple O-rings or, as more preferably shown in FIGS. 1 and 3, a double lobe O-ring which is mounted in a suitably dimensioned portion of the stepped bore 28 in the housing 12. This seats the O-ring 14 in the desired position in the bore 28 as shown in FIG. 3. The top hat 16 is fixedly mounted in the bore 28 by outwardly extending tabs 42 which extend from one end of the top hat 16 and snap into shallow recesses formed in the housing 12 along an intermediate portion of the bore 28. Both the O-ring 14 and the top hat 16 have central bores which are sized for receiving appropriately sized stepped portions of the spool 18 as shown in FIG. 7.

The spool or fitting 18 is in the form of a solid member having a through bore 50 which extends through opposed ends. The spool 18 is formed, by way of example only, with a constant diameter first end portion 52, a slightly larger diameter intermediate portion 54 and a still larger diameter second end portion 56 which terminates in a flat end surface 58. A tubular sleeve 59 projects axially from the end surface 58 and has an annular, outward opening groove 57 formed therein.

The bore 50 in the spool 18 snugly receives the fluid conduit or tube 20. The end 60 of the conduit 20 may be of a single wall or folded over double wall configuration, each of which are provided with an outwardly flared end shape as shown in FIGS. 3 and 7. The outer end portion 62 of the spool 18 is swaged over the end portion 60 of the conduit 20 to fixedly hold the conduit 20 in the spool 18.

Figure 7:
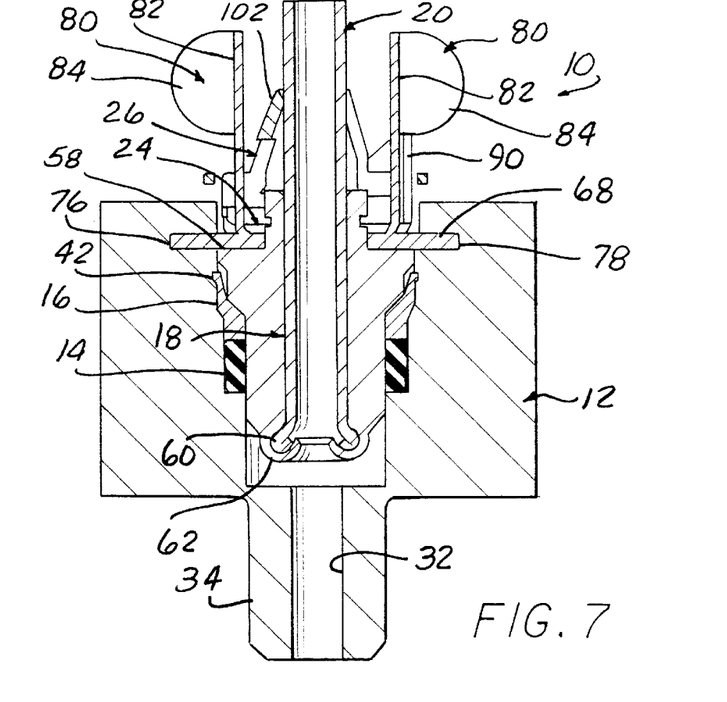
FIG. 7 is a longitudinal, cross-sectional view of the assembled quick connector shown in FIG. 6.

As shown in FIG. 7, when the spool 18 is mounted in the housing 12, the end of the bore in the tube 20 is disposed in substantial axial alignment with the end bore 32 in the stem 34 of the housing 12 to dispose the conduit 20 in fluid flow of communication with at least the end portion of the bore 28 in the housing 12.

The latch 22 is preferably formed of a suitable strength metal, such as steel, and is preferably formed as a stamping. The latch 22 includes a generally planar base 68 containing a central aperture 70 for mounting about the tube 20. In a preferred construction configuration, the base 68 is formed in a folded over configuration along a longitudinal axis.

Preferably, the base 68 has a generally rectangular or non-square, polygonal shape formed of two major dimension side edges 72 and 74 having a longer length and two minor dimension side edges 76 and 78 having a shorter length.

A pair of finger tabs 80 are integrally formed on the base 68 as separate members securely attached to the base 68 by suitable means, such as welding, etc., or as integral, bent portions of the base 68. The finger tabs 80 project outwardly from the plane of the base 68, generally perpendicular to the base 68. Each finger tab 80 is formed of a post 82 and an outer user engageable tab 84 which projects angularly, preferably perpendicularly, from the post 82 and which functions to facilitate rotational movement of the latch 22 as described hereafter.

The clip or latch clip 24 is provided to prevent rotation of the latch 22 from the latched position in the housing 12, as described hereafter. The clip 24 is preferably formed from stamped steel and has an outer U-shaped ring portion 88 in the form of a thin arcuate ring which terminates in an enlarged end post 90 at each end of a discontinuity in the ring 88. Two arms 92 are mounted internally within the U-shaped outer ring 88 and project from a central portion of the outer ring 88 toward the open end of the ring 88 between the end posts 90. Each arm 92 has an arcuate end portion configured to snap around the annular groove 57 in the tubular sleeve 59 on the spool 18. This snap connection secures the clip 24 on the spool 18; while allowing rotation of the clip 24 about the longitudinal axis of the spool 18 as described in greater detail hereafter.

The assembly of the quick connector 10 will now be described with reference to FIGS. 2–7. First, as shown in FIG. 3, the seal member 14 and the top hat 16 are initially fixedly disposed in the bore 28 in the housing 12. Also, the tube 20 is fixedly mounted at the first end 60 in the spool 18 as described above.

Next, the latch 22 is movably disposed about the tubular sleeve 59 of the spool 18 by disposing the central aperture 70 in the base 68 of the latch 22 about sleeve 59 of the spool 18 and projecting from the sleeve 59 about the tube 20.

The clip 24 is then rotatably mounted to the spool 18 via a snap connection between the arms 92 which rotatably are received in the groove 57 in the sleeve 59 of the spool 18 as shown in FIG. 3.

Figure 2:
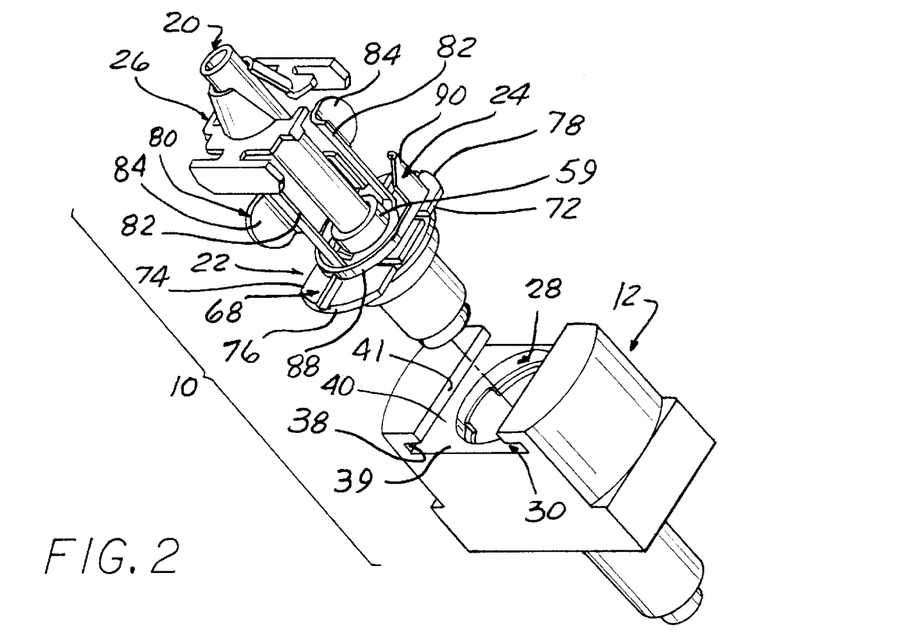
FIG. 2 is an exploded, perspective view of the quick connector shown in FIG. 1, depicted in a partially assembled state.

In this assemblied configuration, as shown in FIG. 2, one of the finger tabs 80 on the clip 24 is disposed between the end portions of the arms 92 on the clip 24 immediately adjacent the center of the U-shaped portion 88 of the clip 24. This fixes the clip 24 and the latch 22 to the spool 18 for simultaneous rotational movement about the longitudinal axis of the spool 18.

Figure 4:
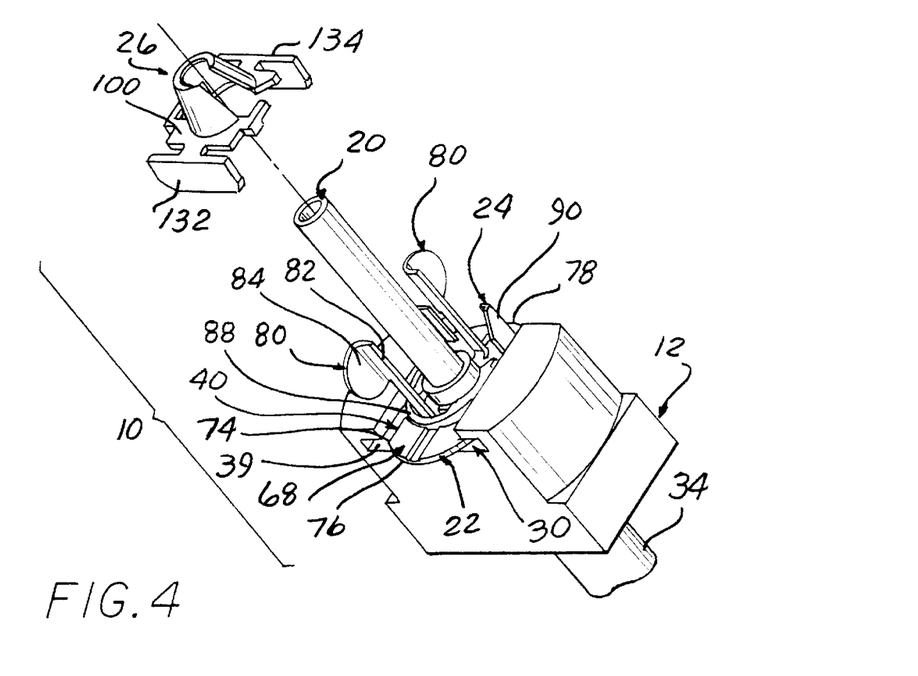
FIG. 4 is an exploded, perspective view showing the tube, spool, latch and latch clip in an initial mounted position in the female component housing.

As shown in FIGS. 2 and 4, with the spool 18, the fluid conduit or tube 20, latch 22 and the clip 24 mounted in their assembled position as described above, the end portion of the spool 18 is inserted into the bore 28 in the housing 12 until the base 68 of the latch 22 seats on the planer inner wall 39 of the transversely extending channel 30 in the housing 12. It should be noted, as shown in FIGS. 2 and 4, that due to the narrow width of the slot 40 of the channel 30, the latch 22 can be inserted through the slot 40 of the channel 30 only when the major dimensional sides 72 and 74 are aligned with the opposing walls 41 of the slot 40. It should also be noted, as shown in FIG. 4, that when the base 68 of the latch 22 seats on the inner wall surface 39 of the channel 30, the end posts 90 of the clip 24 are disposed in proximity or substantial engagement with the inner walls 41 of the slot 40 in the housing 12. Next, as shown in FIG. 5, a rotative force is applied to the finger tabs 80, in either clockwise or counterclockwise directions to rotate the latch 22 from the first installation position shown in FIG. 4 to the second, latched position shown in FIGS. 5 and 7.

During such rotation of the latch 22 from the first position to the second position, the minor side edges 76 and 78 slide into the notches 38 in the channel 30 in the housing 12, with the major side edges 72 and 74 extending crosswise between the pair of notches 38.

Figure 5:
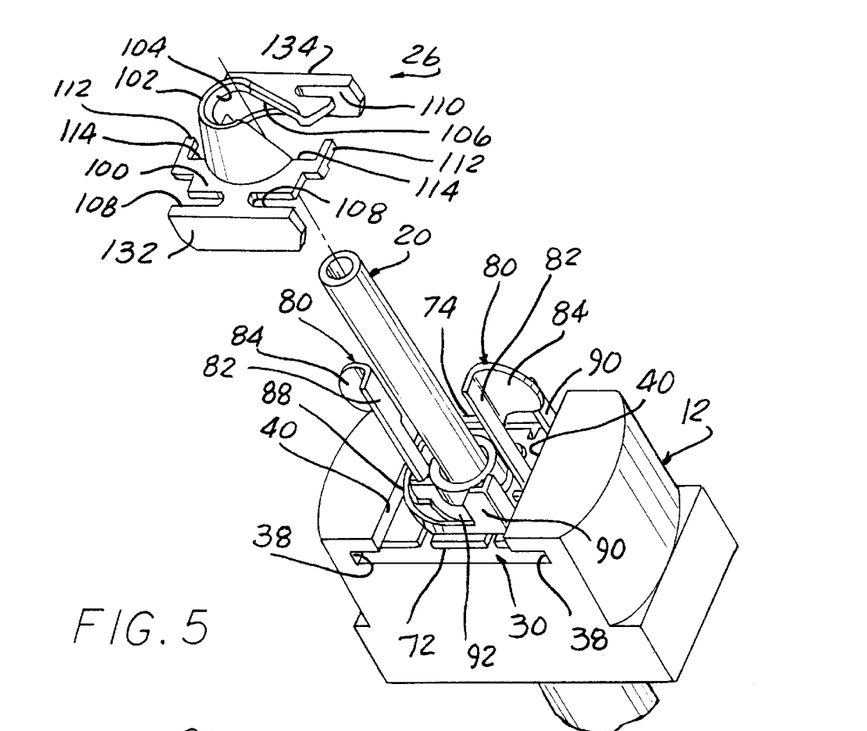
FIG. 5 is a partially exploded, perspective view showing the latch in a 90° rotated position within the female component housing.

Further, during such rotation of the latch 22 from the first position to the second position, as shown in FIG. 5, one end of the clip 24 undergoes bending action due to the sliding movement of one of the end posts 90 along the inner wall 41 of the slot 40 in the housing 12. This bending action takes place as a flexure of one of the end legs of the outer ring 88 of the clip 24 until the moving end post 90 is brought into a fixed position against inner wall 41of the slot 40 as shown in FIG. 5. In this position of the clip 24, the opposite end post 90 is also disposed in proximity with the same inner wall 41 of the sleeve 40. This position places the end posts 90 in a cooperative relationship with the adjacent inner wall 41 of the slot 40 of the channel 30 in the housing 12 to resist further rotation of the clip 24 and the latch 22 unless a significantly high force is applied to the finger tabs 80.

The clip 24 thus functions to prevent the latch 22 from rotating or twisting which could lead to inadvertent release of the male component, including the tube 20, from the female component housing 12. The clip 24 also functions to ensure that the latch 22 remains in the fully latched, second position with the end portions of the base 68 of the latch 24 fully seated within the notches 38 in the housing 12.

When it is necessary to remove the tube 20 from the housing 12, the ends of the outer ring of the clip 24 are compressed or urged toward each other by a squeezing force applied to the end posts 90. At the same time, the finger tabs 80 are engaged and rotated, either clockwise or counterclockwise in the orientation shown in FIG. 5, to rotate the base 68 of the latch 22 back to the first position shown in FIG. 2. In the first position, the tube 20, spool 18, latch 22 and clip 24 may be disengaged from the housing 12 by hand pressure only.

The secondary latch clip 26 is optionally provided to provide further assurance that the latch 22 does not inadvertently rotate out of the second latched position. As shown in FIGS. 1–7, the secondary latch clip 26 is in the form of a one piece body formed of a suitable plastic material, such as Dupont 408L or equivalent. The secondary latch clip 26 has a planar wall 100 from which a truncated conical portion 102 projects. An aperture 104 is formed in the end of the conical portion 102 for mounting the secondary clip 26 about the tube 20. Further, a slot 106 is formed in the sidewall of the conical portion 102 and through the wall 100 to enable the secondary clip 26 to be mounted about the tube 20 after the tube 20 is mounted in the housing 12 via the latch 22, as described above.

Figure 6:
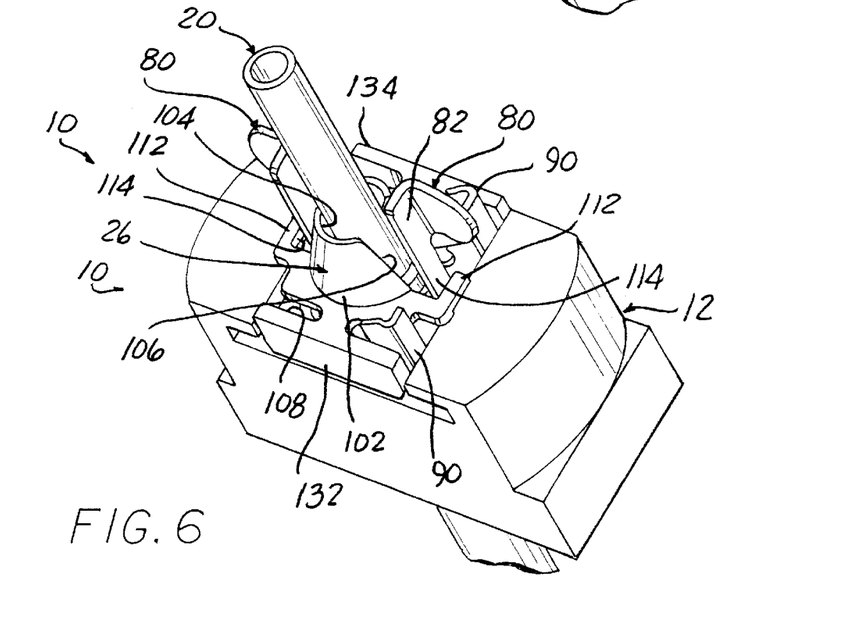
FIG. 6 is a perspective view, similar to FIG. 5, but with the secondary latch installed over the primary latch and clip shown in FIG. 5.

The wall 100 of the secondary latch 26 includes latch surfaces in the form of opposed pairs of slots 108 and 110 at opposite ends of the wall 100. One of the slots 108 and one of the slots 220 are sized to lockingly engage one leg of the end posts 90 on the primary latch clip 24 as shown in FIG. 6.

The wall 100 of the secondary latch clip 26 also includes a pair of intermediate arms 112 which form notches 114 between each arm 112 and the conical portion 102. The arms 112 and the corresponding notches 114 are configured for receiving and engaging the posts 82 of the finger tabs 80 as shown in FIG. 6.

In mounting the secondary latch clip 26 to the previously assembled male and female components of the quick connector 10, the secondary latch clip 26 is manipulated in orientation to slide the various slots 108 and 110 and the arms 112 about the mating end posts 90 on the primary latch clip 24 and the posts 82 on the finger tabs 80 bringing the conical portion 102 around the tube 20. This enables the secondary latch clip 26 to be mounted about the tube 20 after the tube 20, which may have a considerable length relative to the size of the housing 12, to the previously assembled components of the quick connector 10. As shown in FIG. 6, in this latched position, the outer end walls 132 and 134 are disposed between the opposed walls 41 of the slot 40 in the housing 12 to prevent rotation of the secondary latch clip 26, the primary latch clip 24, and the latch 22.

The removal of the male components from the female component of the quick connector 10, as described above, will require an initial removal, such as a prying loose of the secondary latch clip 26 from the primary latch clip 24 and the latch 22. Once the secondary latch clip 26 is removed, the finger tabs 80 may be engaged to rotate the latch 22 from the second latched position back to the first unlatched position as described above.

The above described quick connector 10 has a small compact size while still providing easy twist rotation of the latch 22 to enable the male component to be easily mounted in or removed from the female component 12. This small compact size and easy accessibility to rotation of the latch 22 enables a plurality of like constructed quick connectors 10 to be mounted in a side-by-side arrangement, generally in an axial line, in a manifold 120 shown in FIGS. 8 and 9.

The manifold 120 is configured substantially identical to the body 12, but has an overall longer length to accommodate multiple quick connectors 10. Thus, the manifold 120 is formed of an elongated, one piece body having a longitudinal, axially extending channel 122 formed therein. The channel 122 has an inner wall 124, opposed notches 126 and inner edges 128 having a smaller width than the width between the end walls of the notches 126.

Figure 9:
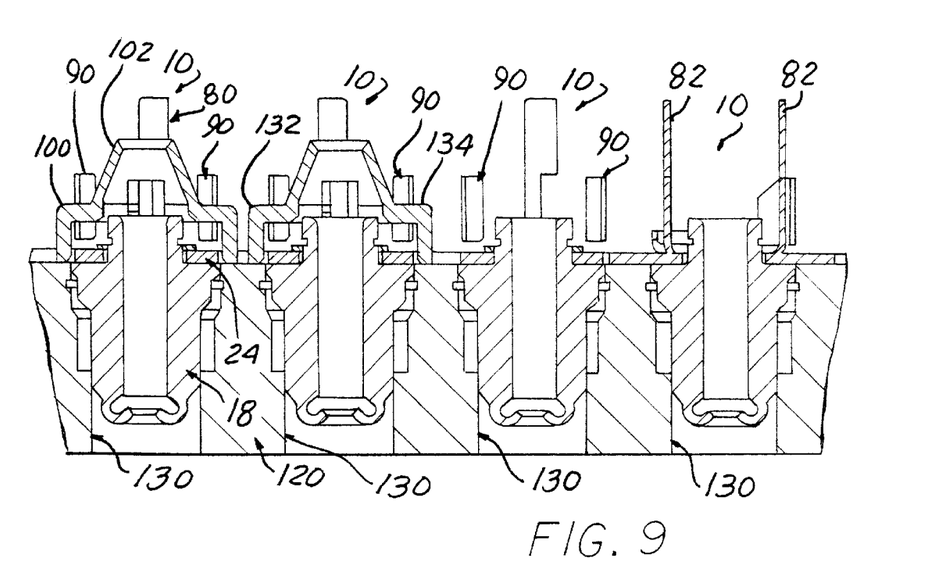
FIG. 9 is a longitudinal cross-sectional view of the manifold assembly and quick connectors shown in FIG. 8.

As shown in FIG. 9, a plurality of bores 130, each substantially identical in shape to the bore 28 in the body 12, are formed in any configuration, such as in a single line, in adjacent rows, etc., in the manifold 120. Each bore 130 has an open end at the inner wall 124 of the channel 122.

The construction, insertion, latching, unlatching and removal of the quick connectors 10 in each of the bores 130 in the manifold 120 is the same as that described above and shown in FIGS. 1–7 for a single connector 10.

Figure 8:
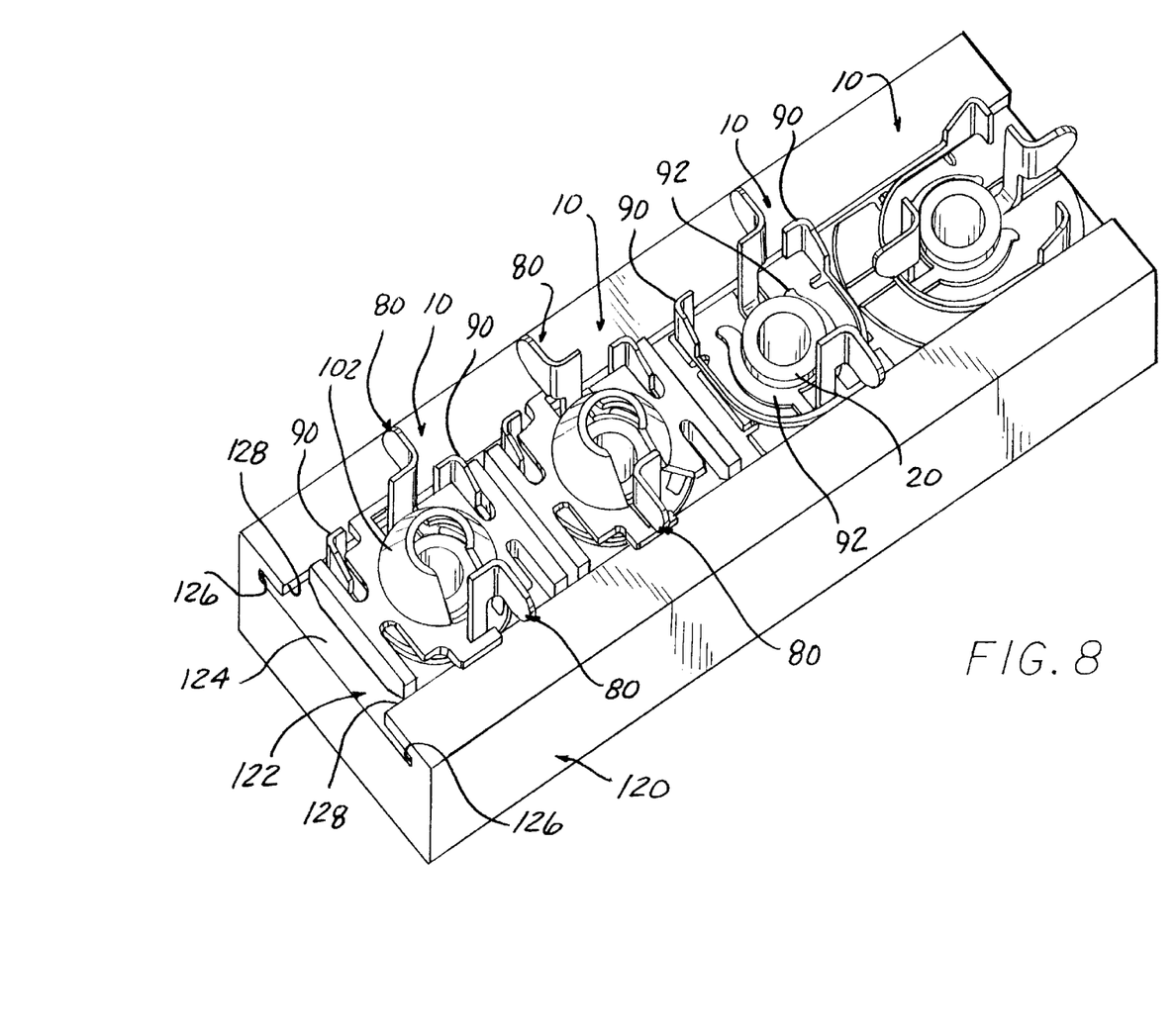
FIG. 8 is a perspective view of a manifold assembly of quick connectors constructed according to the present invention.

As shown in FIGS. 8 and 9, the versatility of the quick connector 10 of the present invention is demonstrated by the two left-most quick connectors 10 in the manifold 120 which have the latches 22 mounted in the manifold 120 180° out of position with respect to each other by example only. This results from the bi-directional twisting rotation of the finger tabs 80 on the respective latches 22 of the left most pair of quick connectors 10 in opposite directions.

The third quick connector 10 from the left end of the manifold 120 in FIG. 8 is depicted in a partially assembled position without the secondary latch clip 26 for clarity in understanding the features and assembly method of the present quick connector 10.

Further, the third quick connector 10 is depicted in the second, latched position with the minor side edges of the latch 22 rotated into engagement with the notches 126 in the channel 122. This is contrasted to the position of the right end most quick connector 10 in the manifold 120 which is depicted in the first, installed, unlatched position prior to rotation to the second, latched position.

In summary, there has been a disclosed a unique quick connector suitable for use in high pressure applications which utilizes a twist latching movement to secure the male component of the quick connector in a female component or housing. The present quick connector has a small compact shape while still providing easy accessibility to the latch member for latching and unlatching rotation of the latch member. A primary latch clip is provided to prevent undesired rotation of the latch member which could lead to inadvertent separation of the male component from the female component. An optional secondary or redundant latch clip is also provided to ensure complete latching of the male component in the female component of the present quick connector.

What is claimed is:

1. A quick connector comprising:
   a male component including a conduit having a first end and a spool fixedly connected to the first end of the conduit and carrying the conduit;
   a female component including a body having a bore extending from a first end, a channel in the body extending transversely to the bore, the channel having opposed sidewalls, opposed notches formed on opposite sidewalls of the channel and extending laterally from the sidewalls to inner walls;
   a latch having a base with an aperture mountable over the conduit and peripheral side edges allowing the latch to be seated in the channel in a first installation position wherein the peripheral side edges do not engage the notches and rotated to a second latched position wherein opposed peripheral side edges of the base engage the notches in the body; and
   a latch clip engagable with the latch and the sidewalls of the channel to resist rotation of the latch from the second latched position.

2. The quick connector of claim 1 wherein the latch further comprises:
   at least one finger tab extending from the base to facilitate rotation of the latch between the first and second positions.

3. The quick connector of claim 1 wherein the latch further comprises:
   two finger tabs extending from the base to facilitate rotation of the latch between the first and second positions.

4. The quick connector of claim 1 wherein:
   the peripheral side edges of the latch define a generally rectangular shape having opposed major dimension spaced side edges and opposed minor dimension spaced side edges.

5. The quick connector of claim 1 further comprising;
   a seal member mounted in the bore in the body for sealingly coupling the spool to the body.

6. The quick connector of claim 2 wherein the latch clip is coupled between the latch and the sidewalls of the channel in the second latched position.

7. A quick connector comprising:
   a male component including a conduit having a first end and a spool fixedly connected to the first end of the conduit and carrying the conduit;
   a female component including a body having a bore extending from a first end, a channel in the body extending transversely to the bore, opposed notches formed on opposite sidewalls of the channel;
   a latch having a base with an aperture mountable over the conduit and peripheral side edges allowing the latch to be seated in the channel in a first installation position and rotated to a second latched position in which opposed side edges of the base engage the notches in the body, the latch further including at least one finger tab extending from the base to facilitate rotation of the latch between the first and second positions; and
   a latch clip engagable with the latch and the sidewalls of the channel to resist rotation of the latch from the second, latched position, the latch clip coupled between the latch and the sidewalls of the channel in the latched position of the latch, the latch clip including:
      a body having a generally U-shaped outer ring with a discontinuity forming spaced ends;
      end posts upstanding from the ends of the outer ring;
      a pair of spaced arms carried interiorly on the outer ring and engagable with the spool for rotatably mounting the latch clip to the spool, the pair of arms encompassing the at least one finger tab on the latch to rotatably couple the latch clip to the latch; and
      the end posts on the outer ring engagable with the opposed sidewalls of the channel in the body to resist rotation of the latch clip and the latch relative to the body.

8. A quick connector comprising:
   a male component including a conduit having a first end and a spool fixedly connected to the first end of the conduit and carrying the conduit;

a female component including a body having a bore extending from a first end, a channel in the body extending transversely to the bore, opposed notches formed on opposite sidewalls of the channel;

a latch having a base with an aperture mountable over the conduit and peripheral side edges allowing the latch to be seated in the channel in a first installation position and rotated to a second latched position in which opposed side edges of the base engage the notches in the body, the latch further including at least one finger tab extending from the base to facilitate rotation of the latch between the first and second positions;

a latch clip engagable with the latch and the sidewalls of the channel to resist rotation of the latch from the second, latched position, the latch clip coupled between the latch and the sidewalls of the channel in the latched position of the latch; and a secondary latch clip engagable with the latch clip, the latch and the sidewalls of the channel to resist rotation of the latch clip and the latch from the second latched position of the latch.

9. The quick connector of claim 8 wherein the secondary latch clip comprises:

a body having a central opening for surrounding the conduit; and apertures formed in the body engagable with the at least one finger tab and the latch clip;

the body non-rotatably seatable in the channel such that the body and the apertures in the body cooperate with the at least one finger tab on the latch, the latch clip, and the sidewalls of the channel to resist rotation of the latch from the second latched position.

* * * * *